April 17, 1962  F. A. WALES  3,029,908
LIQUID COOLED VEHICLE BRAKES
Filed April 7, 1958  2 Sheets-Sheet 1
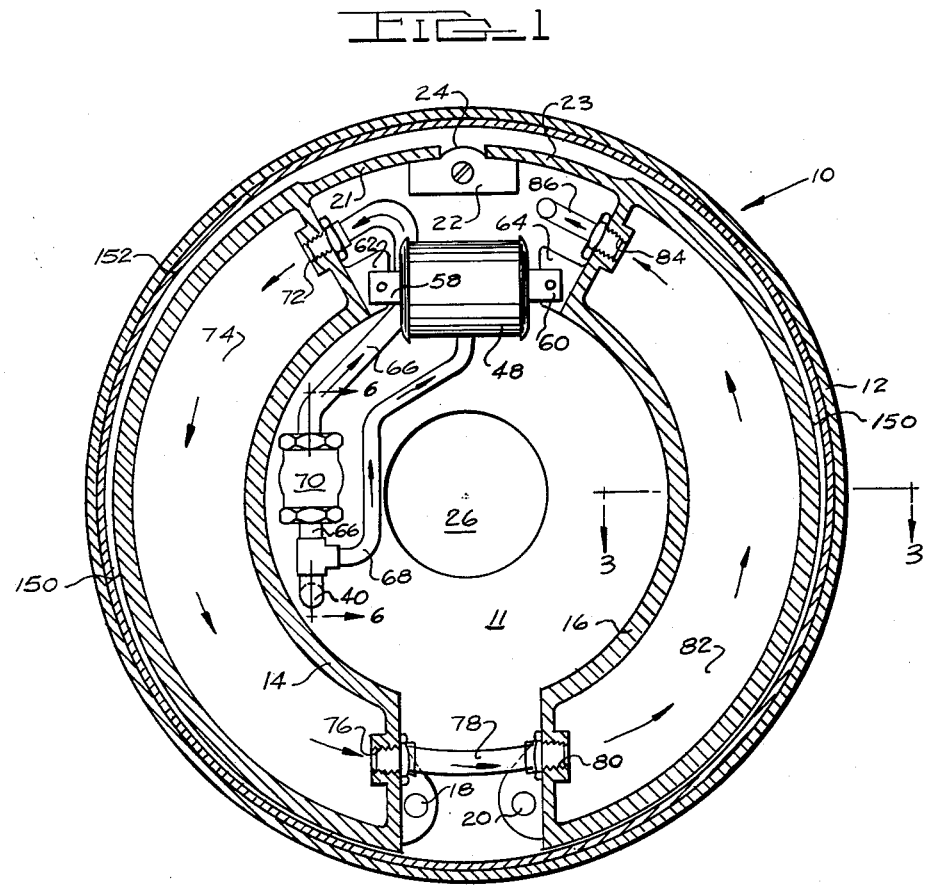
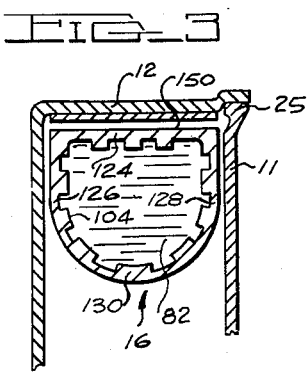
INVENTOR.
FRED A. WALES
BY
SMITH, WILSON, LEWIS & McRAE April 17, 1962   F. A. WALES   3,029,908
LIQUID COOLED VEHICLE BRAKES
Filed April 7, 1958   2 Sheets-Sheet 2
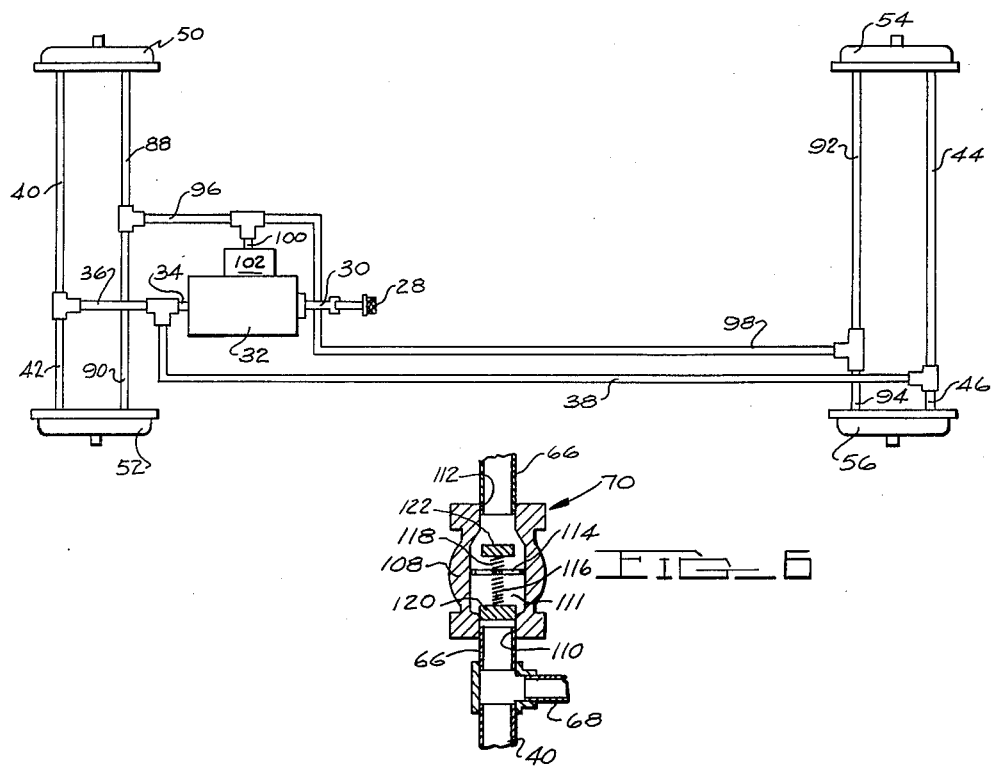
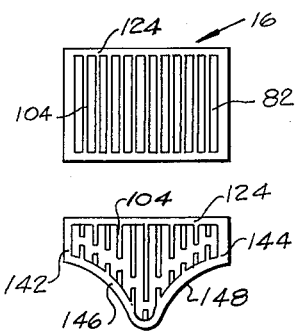
INVENTOR.
FRED A. WALES
BY
SMITH, WILSON LEWIS & McRAE United States Patent Office 3,029,908
Patented Apr. 17, 1962

3,029,908
LIQUID COOLED VEHICLE BRAKES
Fred A. Waies, 31200 Stafford Drive, Birmingham, Mich.
Filed Apr. 7, 1958, Ser. No. 726,917
9 Claims. (Cl. 188—264)

The present invention relates generally to hydraulic braking systems. More particularly, the invention relates to the provision of a cooling system and improved brake units for an hydraulic vehicle braking system.

Recent developments in the automotive industry have been in the direction of increased horse-power for automobile and truck motors. At the same time, attempts have been made to reduce the physical size of the brake units in order to accommodate new wheel designs. The net result of these two trends has been an increase in the amount of heat energy generated in the brakes and a decrease in the mass of the brake units which is available to absorb and dissipate the heat.

One problem encountered with a heat build-up in brakes is "fading." Brakes may fade when subjected to a series of panic stops. These stops according to standard test procedures consist in a full brake application to induce the maximum deceleration from a set speed of 60 to 80 miles per hour down to a speed of approximately 5 to 10 miles per hour, followed by a full power acceleration back up to the predetermined speed of 60 to 80 and again followed by a full brake application down to the lower speed. This process is continued until the brakes no longer respond at which time it is said that the brakes fade at so many cycles of panic stops. Fading is of course caused by the introduction into the brake drum of such high temperature from the brake shoes that the drum expands to a point that the brake shoes can no longer expand to exert the force on a drum sufficient to cause a stopping of the vehicle. It is of course true that the brake shoes expand also but the drum expands much more rapidly than do the shoes so that the drum "gets away from" the shoe. This is probably due to the fact that the shoes are insulated from the heat by the material of the lining.

As the styling departments continue to press for a reduction in the overall height of cars, still further reductions in the diameter of wheels are expected, and serious problems of providing adequate braking are encountered as the diameter of the wheels are reduced.

The conventional brake unit does not utilize a special cooling system. The heat generated during an application of the brake is dissipated during the intervals between usage by means of the normal circulation of air over the heated parts and by convection to adjacent metal parts. According to the present invention a liquid brake cooling system is provided which utilizes the braking fluid as a coolant. Further, a novel construction and arrangement of the shoes, drum and lining is provided to assist in the cooling process. The result is a brake which is rapidly cooled during and after usage to prevent high temperatures from interfering with the brake efficiency and causing rapid deterioration of the brake.

It is thus an object of this invention to provide a cooling system for an hydraulic vehicle braking system.

It is another object of this invention to provide an hydraulic braking system in which a liquid coolant is circulated through hollow brake shoes during the operation of the brakes.

Another object in one embodiment is the provision of a liquid cooling system for hydraulic brakes which is operated by the depression of the brake pedal.

A still further object of this invention is the provision of a cooling system for hydraulic brakes which utilizes the hydraulic brake fluid as the coolant.

Another object of the invention is the provision of brake shoes and drums fabricated from aluminum.

A further object of this invention is the provision of an hydraulic brake unit in which the brake shoes have a hardened metal surface and the drum has a brake lining extending around the entire inner periphery.

Other objects of this invention will appear in the following description and appended claims, reference being had to the accompanying drawings forming a part of this specification wherein like reference characters designate corresponding parts in the several views.

In the drawings:

FIG. 1 is a sectional view of an hydraulic brake unit which is one embodiment of the invention.

FIG. 2 is a diagrammatical view of a hydraulic braking system utilizing the braking unit of FIG. 1.

FIG. 3 is a sectional view taken substantially along the line 3—3 of FIG. 1 looking in the direction of the arrows.

FIG. 4 is a sectional view of a second embodiment of a brake shoe taken along a plane substantially similar to FIG. 3.

FIG. 5 is a sectional view of another embodiment of a brake shoe taken along a plane substantially similar to FIG. 3.

FIG. 6 is a sectional view taken substantially along the line 6—6 of FIG. 1 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The brake unit 10 illustrated in FIGS. 1 and 6 represents, in its general construction and braking action, one brake which may be utilized according to the present invention; however, it is not intended to limit the scope of the invention to the specific conventional arrangement of parts shown.

The brake 10 as shown is a front wheel brake. It comprises a circular brake backing plate 11 which is fixedly mounted on an axle 26. A pair of brake shoes 14, 16 are pivotally mounted in diametrically opposed positions on the backing plate 11 by means of pins 18, 20. The opposite ends of the shoes 14, 16 are provided with circumferentially extending flanges 21, 23 which ride on a projection 22 provided on the face of the backing plate 11. A stop 24 is provided centrally of the projection 22 to position the shoes 14, 16 in their normal rest position. The brake drum 12 is rotatably mounted on an outwardly extending peripheral flange 25 of the backing plate 11 and a ground engaging wheel (not shown) is fixedly mounted on the drum 12 to complete the wheel assembly.

The hydraulic brake-actuating circuit is best seen in FIG. 2. A master operating device comprising a main or master cylinder 32 is provided to operate all of the brake units 50, 52, 54, 56. The piston 30 of the master cylinder 32 is actuated by depression of a brake pedal 28. A fluid feeding connection provided between the master operating device and each of the brakes 50, 52, 54, 56 comprises a fluid line 34 which leads from the master cylinder and divides into a branch line 36 leading to the forward end of the vehicle and a branch line 38 leading to the rearward end of the vehicle. Each branch 36, 38 sub-divides into two more branches 40, 42, 44, 46 which lead to the wheel cylinders 48 mounted in the brake units 50, 52, 54, 56. Fluid pressure originating in the master cylinder 32 by actuation of the piston 30 is consequently transmitted as an equalized pressure to the wheel cylinders 48.

The fluid pressure in each wheel cylinder 48 actuates a pair of oppositely disposed pistons 58, 60 which are pivotally connected to projections 62, 64 of the brake shoes 14, 16. The pistons 58, 60 will move towards the shoes 16, 18 forcing them outward into braking engagement with the inner periphery of the drum 12. When the pedal 28 is released, the fluid pressure is relieved and a brake-shoe retracting spring (not shown) retracts the shoes 14, 16 away from contact with the drum 12, and at the same time, forces the pistons 58, 60 inward. This movement forces fluid out of the cylinder 48 and back into the master cylinder 32.

According to the present invention, a brake fluid by-pass line 66 is provided within the brake unit leading from the wheel cylinder line 68 to one end of a hollow brake shoe 14 thereby directing a portion of the brake fluid into the shoes 14, 16 to serve as a coolant.

Valve means 70 are provided in the by-pass line 66 in order to insure that a proper braking pressure is maintained in the wheel cylinder line 68. The valve 70 comprises flow control means to limit the amount of fluid by-passed into the shoes 14, 16. It is also desirable to have pressure control means in the valve 70 to the end that no fluid will be by-passed into the cooling system until the pressure in the brake line 68 reaches a minimum safe operating value.

FIG. 6 illustrates one suitable by-pass valve 70. The valve 70 comprises a valve body 108 provided with a central fluid chamber 111 having inlet and outlet openings 110, 112. A pair of oppositely disposed plugs 120, 122 are resiliently mounted within the chamber 111 by means of spring elements 116, 118 which are secured at one end to a spring support member 114 secured centrally of the chamber 111. The support member 114 is apertured to allow fluid flow through the chamber 111.

The plugs 120, 122 control the openings 110, 112 so as to regulate the flow of coolant through the valve 70. The spring 116 constantly urges the plug 120 towards the inlet opening 110. The plug 120 is adapted to seal the opening 110 against fluid flow into the valve 70 until the pressure in the brake line overcomes the spring resistance. This point may be set at the desired safe level for brake operation by the selection of a suitable spring 116.

An annular fluid passageway is formed downstream of the plug 120 by the outer periphery of the second plug 122 and the walls of the chamber 111 adjacent thereto. This annular passageway may be termed the effective outlet opening as it will form a fluid restriction when the plug 122 is moved towards the opening 112 by the pressure of the coolant.

In operation, the plug 122 is held in an initial position by the spring 118. When fluid passes through the valve 70 it exerts a pressure on the plug 122 urging it towards the opening 112. The plug 122 will move until a point of equilibrium is reached between the fluid pressure and the counter-resistance of the spring 118. As the plug 122 moves toward the opening 112 the effective outlet opening is reduced since the walls of the chamber 111 are tapered inwardly towards the outlet opening 112. Consequently, even though the fluid pressure increases, the flow rate through the valve 70 may be made constant by the selection of a suitably sized spring 118 and the proper slope of the walls of the chamber 111.

It will be readily appreciated that the use of the valve 70 prevents the brake cooling system from interfering with normal operation of the brake cylinder 48. The use of an on-off valve element 120 assures that no fluid will be circulated through the cooling system until there is a sufficient pressure build-up to operate the brake cylinder 48. It is to be noted that operation of the cylinder 48 is a function of pressure and does not depend on the amount of fluid flowing from the master cylinder 32. If at any time the pressure in the line falls below the predetermined minimum value for brake cylinder operation, the valve element 120 will move to close the by-pass valve 70 to prevent a further pressure drop due to the cooling system. In addition, the maximum pressure drop which may occur in the cooling system is controlled by the flow control valve element 122. The flow control construction provides a safety factor in brake operation for the times when it is necessary to apply a high braking force for a quick stop. Since the pressure drop due to the cooling system is a relatively fixed quantity, any increased increment of pressure in the line is maintained and applied to brake cylinder 48, and consequently to the brake shoes 14, 16.

As previously mentioned, the brake fluid in the by-pass line 66 leads to an opening 72 provided in one end of the brake shoe 14. The shoes 14, 16 are formed with a hollow fluid tight interior to provide a cavity 74 for the circulation of the coolant. As indicated by the arrows in FIG. 1, the fluid flows through the cavity 74 and out an opening 76 provided in the opposite longitudinal end of the shoe 14. A length of flexible tubing 78 leads from the outlet opening 76 to the inlet opening 80 of the second shoe 16. The shoe 16 is also formed with a cavity 82 for the circulation of the coolant. The fluid continues to flow in the direction of the arrows and is emptied from the shoe 16 by means of an outlet opening 84 provided at the opposite longitudinal end thereof. A fluid return line 86 leads from the shoe 16 and out of the brake unit 10. The brake fluid return connection between the brake shoes and the master cylinder 32 comprises branch fluid return lines 88, 90 leading from the foreward end of the vehicle and branch lines 92, 94 from the rearward end. Each pair of branches 88, 90, 92, 94 is joined to form two main branch return lines 96, 98 which in turn are connected to the main return line 100 which leads to a fluid reservoir 102 which is secured in fluid communication with the master cylinder 32. The reservoir 102 may be provided to hold the additional amount of brake fluid necessary for the cooling system.

FIGS. 3–5 illustrate three suitable embodiments of the brake shoes 14, 16. It will, however, be obvious to one skilled in the art that other configurations are possible within the scope of the invention. FIG. 3 illustrates a brake shoe 16 having a cross-section comprising a substantially straight drum engaging wall 124 with straight wall portions 126, 128 extending from the ends thereof at substantially right-angles threto and joined together by means of an outwardly curved wall portion 130. FIG. 4 shows a shoe 16 having a substantially rectangular cross-sectional configuration. FIG. 5 illustrates the third embodiment which comprises a substantially straight drum engaging wall 124 with straight wall portions 142, 144 extending for a short distance from the ends thereof at substantially right-angles thereto and joined together by inwardly curved wall portions 146, 148. The different brake shoe 16 cross-sectional configurations of FIGS. 3–5 permit variations in shoe strength and method of manufacture. Further, the quantity of coolant circulating through the shoe may be varied by the different embodiments in accordance with the size of the brake unit 10. A larger brake 10 will generate more heat and consequently require a larger volume of coolant. The effective area of the surface of the cavity 82 in contact with the coolant may be increased, as shown in FIGS. 3–5, by the provision of a plurality of inwardly projecting fins 104 on the interior surfaces of the walls forming the shoe 16. The fins 104 may be relatively short and thick as shown in FIG. 3, they may be thin and extend from the hot brake engaging wall 124 to the cold inner wall 125 so as to dissipate some of the heat by conduction as indicated in FIG. 4 or they may be short on the cold walls 146, 148 and longer on the hot wall 124 in accordance with the relative heat to be dissipated by these walls 146, 148, 124 as shown in FIG. 5.

The brake shoes 14, 16 are preferably formed of an aluminum alloy and may be fabricated by such mass production methods as die casting or extrusion. The use of aluminum over the conventional steel construction permits a reduction in weight and aids appreciably in cooling the shoe by rapidly radiating the heat. The drum engaging surface 150 of the aluminum shoe must be hardened in order to have good abrasion resistance properties. The preferable method of hardening is by the use of the anodizing process.

A further improvement over the conventional brake unit is indicated in FIG. 1 which shows the brake lining 152 secured to the inner periphery of the brake drum 12 rather than to the brake shoes 14, 16. This arrangement results in a better braking action between the shoes 14, 16 and the lining 152 and also decreases the heat build-up in the brake unit. This arrangement prevents the brake drum 12, which may also be fabrciated from an aluminum alloy, from becoming hot since it is insulated from the hot surfaces of the shoes 14, 16 and lining 152 by the non-heat conducting material of the lining 152. The heat of braking is generated adjacent the engaging shoe and lining surfaces and is rapidly conducted through the metal shoes to the coolant consequently keeping the brake unit relatively cool.

As may be seen the brake unit 10 of the present invention provides a brake which can withstand high braking stresses while remaining relatively cool this adding greatly to the life of the various parts. The use of the brake fluid as a coolant and the master operating device to operate the cooling system results in a system which is inexpensive to install and will add a minimum to the maintenance costs. An advantage resulting from the use of the brake fluid as the coolant lies in the fact that it is readily available and has been tested in use over a long period of time and is consequently adapted to the range of freezing and hot temperatures to which the brake unit is ordinarily subjected.

Having thus described my invention, I claim:

1. The combination of an hydraulic brake system comprising a master cylinder including a brake fluid reservoir and a pump; a plurality of brakes; a fluid feeding connection between said master cylinder and each of the brakes; each brake comprising a brake drum, a plurality of brake shoes mounted within the drum to move into braking engagement with the drum, fluid cylinder means fed by said fluid feeding connection to operate the shoes; each of said brake shoes having a hollow fluid tight interior with fluid inlet and outlet openings, a bypass line interconnected in the fluid feeding line between the master cylinder and the hollow interior of the brake shoes, valve means to control the flow rate in said bypass line and to bypass the fluid cylinder means only when the fluid pressure is above brake operating pressure, said valve means comprising a check valve structure to open the bypass line at a predetermined fluid pressure and a flow control valve structure to control the rate of fluid flow through the bypass line upon opening of said check valve structure; and a brake fluid return connection between the brake shoes and the master cylinder.

2. A device as claimed in claim 1 and further characterized in the provision of a plurality of fins projecting inwardly from the interior surface of said hollow brake shoes.

3. A device as claimed in claim 1 and further characterized in the provision of said brake shoes having a substantially rectangular cross-section.

4. A device as claimed in claim 1 and further characterized in the provision of said brake shoes having a cross-section comprising a substantially straight drum engaging wall with straight wall portions extending from the ends thereof at substantially right-angles thereto and joined together by means of an outwardly curved wall portion.

5. A device as claimed in claim 1 and further characterized in the provision of said brake shoes having a cross-section comprising a substantially straight drum engaging wall with straight wall portions extending for a short distance from the ends thereof at substantially right-angles thereto, and joined together by inwardly curved wall portions.

6. A device as claimed in claim 1 and further characterized by the provision of brake shoes fabricated from an aluminum alloy with the drum engaging surfaces having a hard anodized coating.

7. A device as claimed in claim 1 and further characterized by the provision of a brake lining secured to the inner periphery of the brake drum, and brake shoes fabricated from an aluminum alloy with the drum engaging surfaces having a hard anodized coating.

8. The combination of an hydraulic brake system comprising a master cylinder including a brake fluid reservoir and a pump; a plurality of brakes; a fluid feeding connection between said master cylinder and each of the brakes; each brake comprising a brake drum, a plurality of brake shoes mounted within the drum to move into braking engagement with the drum, fluid cylinder means fed by said fluid feeding connection to operate the shoes; each of said brake shoes having a hollow fluid tight interior with a fluid inlet opening at one longitudinal end and a fluid outlet opening at the other longitudinal end, a bypass line interconnected in the fluid feeding line between the master cylinder and the inlet opening of one brake shoe, a brake fluid return connection between the outlet opening of another brake shoe and the master cylinder, a fluid connection between the remaining inlet and outlet openings forming a complete fluid circuit through the shoes, and valve means to control the flow rate in said bypass line and to by-pass the fluid cylinder means only when the fluid pressure is above brake operating pressure, said valve means comprising a check valve structure to open the bypass line at a predetermined fluid pressure and a flow control valve structure to control the rate of fluid flow through the bypass line upon opening of said check valve structure.

9. A device as claimed in claim 8 and further characterized in that said valve means includes means to allow flow into the bypass line when pressure in the fluid feeding connection reaches a predetermined value and to thereafter control the rate of flow in the bypass line in relation to the pressure in the fluid feeding connection.

References Cited in the file of this patent

UNITED STATES PATENTS

| | | |
|---|---|---|
| 1,874,624 | Rice et al. | Aug. 30, 1932 |
| 1,952,967 | Boughton | Mar. 27, 1934 |
| 2,167,551 | Musselman | July 25, 1939 |
| 2,174,635 | Linderman | Oct. 3, 1939 |
| 2,195,130 | Hoyt | Mar. 26, 1940 |
| 2,226,457 | Whittingham | Dec. 24, 1940 |

(Other references on following page)

UNITED STATES PATENTS

| | | |
|---|---|---|
| 2,378,100 | Pogue | June 12, 1945 |
| 2,406,304 | Levy | Aug. 20, 1946 |
| 2,409,099 | Bloomfield | Oct. 8, 1946 |
| 2,471,858 | Bloomfield | May 31, 1949 |
| 2,742,982 | Helmbold | Apr. 24, 1956 |
| 2,755,903 | McAninch et al. | July 24, 1956 |
| 2,788,870 | Heck | Apr. 16, 1957 |
| 2,821,271 | Sanford | Jan. 28, 1958 |
| 2,911,075 | Damiron | Nov. 3, 1959 |
| 2,976,965 | Schjolin | Mar. 28, 1961 |

FOREIGN PATENTS

| | | |
|---|---|---|
| 481,181 | Canada | Feb. 19, 1952 |
| 802,800 | France | June 22, 1936 |
| 1,001,791 | France | Oct. 24, 1951 |
| 896,915 | Germany | Nov. 16, 1953 |
| 339,722 | Great Britain | Dec. 18, 1930 |
| 640,963 | Great Britain | Aug. 2, 1950 |
| 677,144 | Great Britain | Aug. 13, 1952 |
| 701,725 | Great Britain | Dec. 20, 1953 |
| 739,244 | Great Britain | Oct. 26, 1955 |
| 524,690 | Italy | Apr. 15, 1955 |